US006718478B2

(12) United States Patent
Yoon et al.

(10) Patent No.: US 6,718,478 B2
(45) Date of Patent: Apr. 6, 2004

(54) CIRCUIT FOR GENERATING A START PULSE SIGNAL FOR A SOURCE DRIVER IC IN TFT-LCD ON DETECTING A LEADING EDGE OF A DATA ENABLE

(75) Inventors: Sang Ho Yoon, Kyoungki-do (KR); Jin Young Jeong, Kyoungki-do (KR); Yong Il Kim, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 609 days.

(21) Appl. No.: 09/740,453

(22) Filed: Dec. 19, 2000

(65) Prior Publication Data

US 2001/0007135 A1 Jul. 5, 2001

(30) Foreign Application Priority Data

Dec. 29, 1999 (KR) .......................................... 99-64597

(51) Int. Cl.[7] ................................................ G06F 1/04
(52) U.S. Cl. ...................................................... 713/500
(58) Field of Search ................................ 713/500, 600, 713/400; 327/558

(56) References Cited

U.S. PATENT DOCUMENTS

| | | | | |
|---|---|---|---|---|
| 5,565,812 A | * | 10/1996 | Soenen | 327/558 |
| 5,592,113 A | * | 1/1997 | Quiet et al. | 327/158 |
| 6,636,980 B1 | * | 10/2003 | Gervais et al. | 713/600 |

* cited by examiner

*Primary Examiner*—Thomas Lee
*Assistant Examiner*—Pranav Chandrasekhar
(74) *Attorney, Agent, or Firm*—Ladas & Parry

(57) ABSTRACT

A circuit for generating a start pulse signal for a source driver IC in a TFT-LCD includes: a first latch unit for receiving a data enable signal and a reset signal, extracting a leading edge of the data enable signal in a leading edge of a main clock signal, and latching the data enable signal in a trailing edge thereof; a logic gate unit for receiving a complementary signal of the output signal from the first latch unit and the data enable signal, and generating a pulse signal in a leading edge of the data enable signal; and a second latch unit for receiving the output signal from the logic gate unit and the reset signal, outputting the output signal from the logic gate unit as a start pulse signal in the leading edge of the main clock signal, and latching the output signal from the logic gate unit in the trailing edge thereof.

4 Claims, 3 Drawing Sheets

CIRCUIT FOR GENERATING A START PULSE SIGNAL FOR A SOURCE DRIVER IC IN TFT-LCD ON DETECTING A LEADING EDGE OF A DATA ENABLE

BACKGROUND OF THE INVENTION

1. Field of the Invention

The present invention relates to a circuit for generating a start pulse signal for a source driver integrated circuit (IC) in a thin film transistor-liquid crystal display (TFT-LCD) and in particular to an improved circuit for generating a start pulse signal for a source driver IC in a TFT-LCD which can remarkably reduce a layout area, and restrict setup and hold violations.

2. Description of the Background Art

In general, a TFT-LCD that is a kind of an active LCD is thin and light-weighted and consumes small power, and thus has been popularly used for a portable display device, such as a notebook computer. Nowadays, the TFT-LCD is even employed for the operation of vehicles and the audio/video of monitors.

A start pulse signal STH is a control signal inputted to a source driver IC through a timing controller in the AFT-LCD. The start pulse signal STH serves to inform that an effective input data is included in data inputted from a data driver to the source driver IC. A circuit for generating the start pulse signal STH generates the start pulse signal STH at an initial period of a data enable signal DE. The constitution and operation of a conventional circuit for generating the start pulse signal will now be described with reference to FIG. 1.

FIG. 1 is a circuit diagram illustrating the conventional circuit for generating the start pulse signal, including: a 5 bit counting unit 10 for counting a main clock signal MCLK; an AND gate AND1 for receiving a data enable signal DE and a reset signal Reset; a latch unit 20 consisting of first to fifth flip-flops 21~25 for respectively receiving the output signal from the 5 bit counting unit 10 as an input signal S, the main clock signal MCLK as a trigger input, and the output signal from the AND gate AND1 as a reset signal R, and feedback-inputting an output signal D to the 5 bit counting unit 10; a decoding unit 30 consisting of a NAND gate NA1 for receiving a complementary signal of the output signal D from the first to fourth flip-flops 21~24, and an AND gate AND2 for receiving complementary signals of output signals from the NAND gate NA1 and the fifth flip-flop 25; and a sixth flip-flop 40 for receiving the output signal from the NAND gate NA1 and a complementary signal of the output signal from the AND gate AND2 as input signals S, S', the reset signal Reset as a reset signal R, and the main clock signal MCLK as a trigger input T, and generating the start pulse signal STH.

When the reset signal Reset and the data enable signal DE are at a high level, the first to fifth flip-flops 21~25 of the latch unit 20 receive the main clock signal MCLK as the trigger input T and convert output signals in a clock leading edge. Here, the output signals D from the first to fifth flip-flops 21~25 are inputted to the decoding unit 30, and at the same time feedback-inputted to the 5 bit counting unit 10.

The decoding unit 30 combines the output signals from the first to fifth flip-flops 21~25, and inputs it to the sixth flip-flop 40 for generating the start pulse signal STH.

The sixth flip-flop 40 receives the output signal from the NAND gate NA1 and the complementary signal of the output signal from the AND gate AND2 as input signals S and S', the reset signal Reset as a reset signal R, and the main clock signal MCLK as a trigger input T, thereby generating the start pulse signal STH.

However, as illustrated in FIG. 1, the conventional circuit for generating the start pulse signal includes the 5 bit counting unit 10 for receiving and counting the main clock signal MCLK, the latch unit 20 consisting of 5 flip-flops for latching the output from the counting unit 10, the decoding unit 30 for decoding the output signal from the latch unit 20, and the flip-flop for generating the start pulse signal by synchronizing the output signal from the decoding unit 30 to the main clock signal MCLK. As described above, the conventional circuit for generating the start pulse signal requires many devices, which results in increase of a chip area. In addition, the setup and hold violations are generated.

SUMMARY OF THE INVENTION

Accordingly, an object of the present invention is to provide a circuit for generating a start pulse signal for a source driver IC in a TFT-LCD which can remarkably reduce a layout area and restrict setup and hold violations, by generating the start pulse signal by a simple circuit for detecting a leading edge of a data enable signal, instead of a complicated counter circuit.

In order to achieve the above-described object of the present invention, there is provided a circuit for generating a start pulse signal for a source driver IC in a TFT-LCD, including: a first latch unit for receiving a data enable signal and a reset signal, extracting a leading edge of the data enable signal in a leading edge of a main clock signal, and latching the data enable signal in a trailing edge thereof; a logic gate unit for receiving a complementary signal of the output signal from the first latch unit and the data enable signal, and generating a pulse signal in a leading edge of the data enable signal; and a second latch unit for receiving the output signal from the logic gate unit and the reset signal, outputting the output signal from the logic gate unit as a start pulse signal in the leading edge of the main clock signal, and latching the output signal from the logic gate unit in the trailing edge thereof.

In accordance with a preferred aspect of the present invention, the first latch unit is an RS flip-flop.

In accordance with another preferred aspect of the present invention, the logic gate unit is an AND gate.

In accordance with still another preferred aspect of the present invention, the second latch unit is a D flip-flop.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
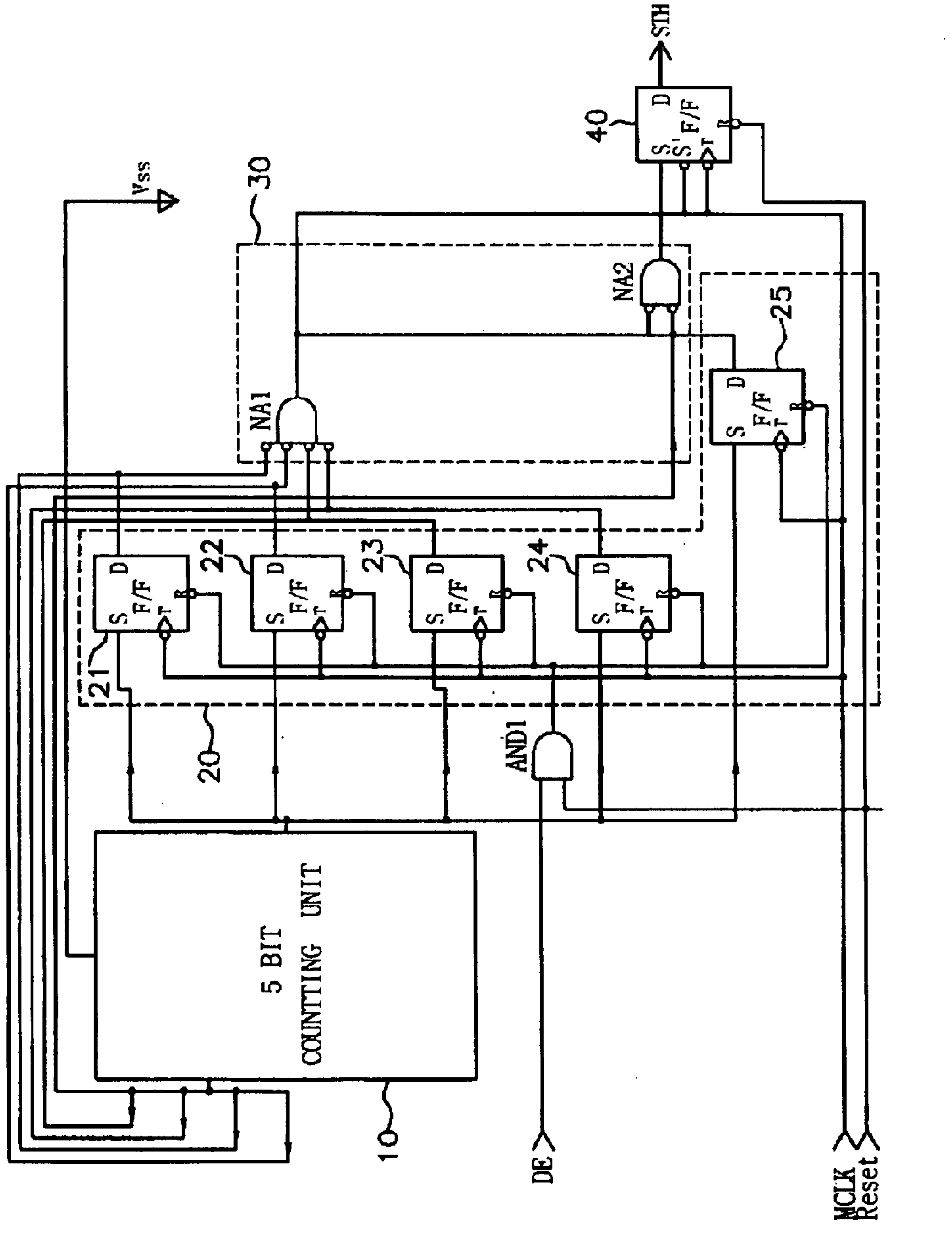
FIG.1 (PRIOR ART)
FIG. 1 is a circuit diagram illustrating a conventional circuit for generating a start pulse signal for a source driver IC.

A circuit for generating a start pulse signal for a source driver IC in a TFT-LCD in accordance with a preferred embodiment of the present invention will now be described with reference to the accompanying drawings.

In the drawings, elements having an identical function are provided with the identical reference numeral, and repeated explanations thereof will be omitted.

Figure 2:
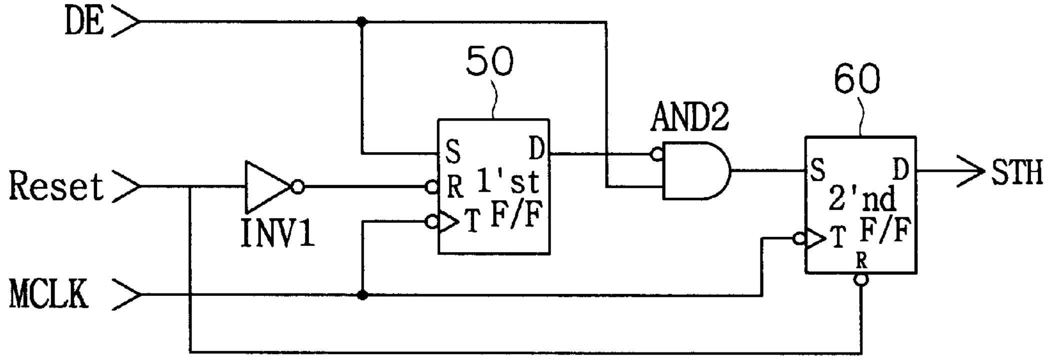
FIG. 2 is a circuit diagram illustrating a circuit for generating a start pulse signal for a source driver IC in accordance with the present invention.

FIG. 2 is a circuit diagram illustrating the circuit for generating the start pulse signal for the source driver IC in accordance with the present invention. The circuit includes: a RS flip-flop circuit 50 for receiving a data enable signal DE as an input signal S, a complementary signal of a reset signal Reset as a reset signal R, and a main clock signal MCLK as a trigger signal T; an AND gate AND2 for receiving a complementary signal of the output signal D from the RS flip-flop circuit 50 and the data enable signal DE; and a D flip-flop circuit 60 for receiving the output signal from the AND gate AND2 as an input signal S, the reset signal Reset as a reset signal R, and the main clock signal MCLK as a trigger input T, and generating the start pulse signal STH.

The RS flip-flop circuit 50 receives the data enable signal DE and the reset signal Reset, extracts a leading edge of the data enable signal DE in a leading edge of the main clock signal MCLK, and latches the data enable signal DE in a trailing edge thereof.

The AND gate AND2 receives a complementary signal of the output signal D from the RS flip-flop circuit 50 and the data enable signal DE, extracts a leading edge of the data enable signal DE, and generates a pulse signal corresponding to one period of the main clock signal MCLK. Here, the output signal from the AND gate AND2 is an output signal to a data inputted prior to the main clock signal MCLK. Therefore, the leading edge of the data enable signal DE is detected through the AND gate AND2.

The D flip-flop circuit 60 receives the output signal from the AND gate AND2, the reset signal Reset and the main clock signal MCLK, outputs the output signal from the AND gate AND2 as the start pulse signal STH in the leading edge of the main clock signal MCLK, and latches the output signal from the AND gate AND2 in the trailing edge thereof.

In accordance with present invention, the circuit for generating the start pulse signal detects the leading edge of the data enable signal DE, and generates one clock pulse in an initial period of the leading edge of the data enable signal DE.

Figure 3:
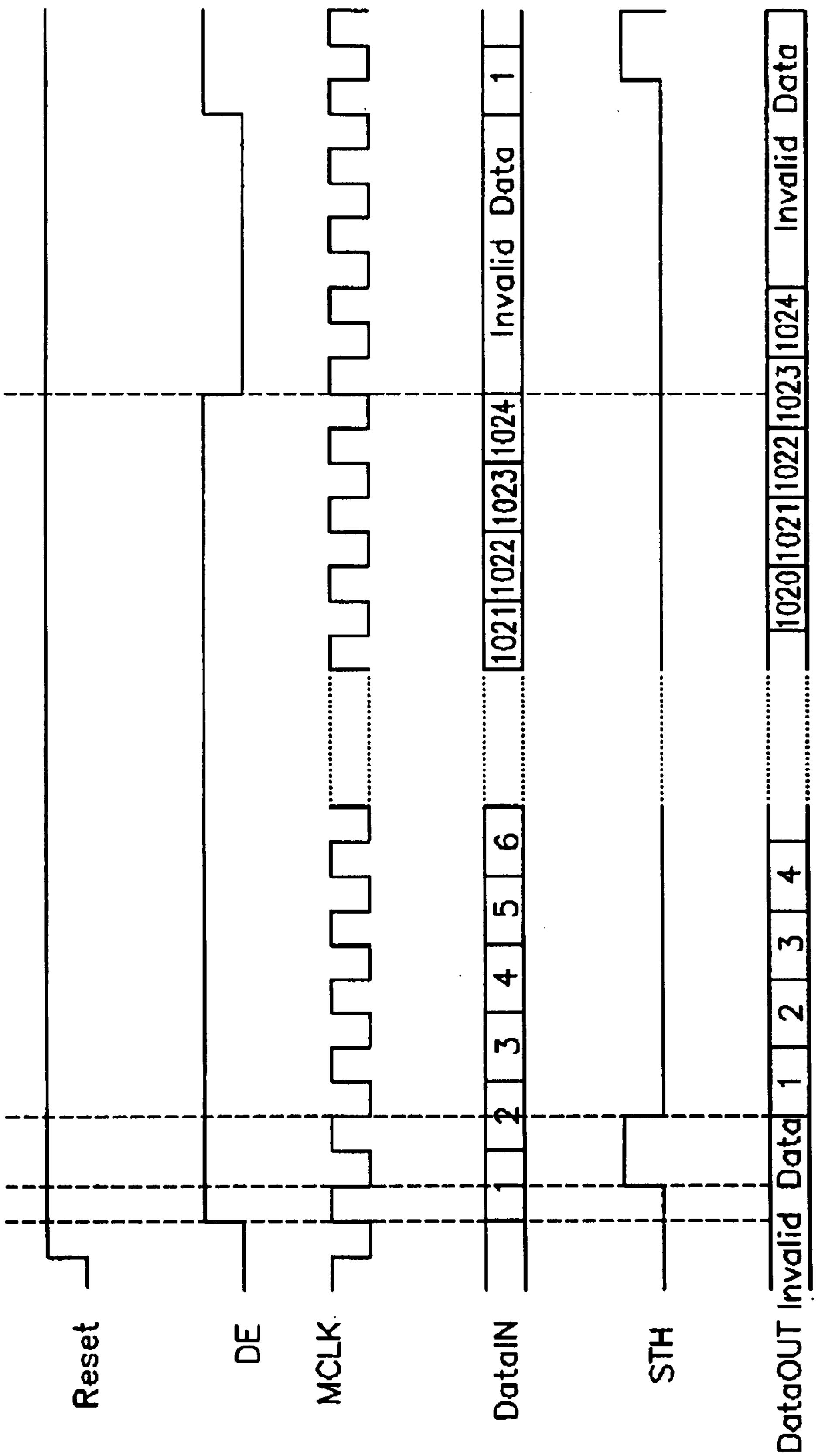
FIG. 3 is a waveform diagram of signals as shown in FIG. 2.

FIG. 3 is a waveform diagram of the respective signals as shown in FIG. 2.

Referring to FIG. 3, when the reset signal Reset is at a high level, transition of the data enable signal DE to a high level is detected, and one clock signal is generated by the trigger of the main clock signal MCLK in the initial period of the data enable signal DE.

At this time, a timing controller must control a first effective input data to be inputted after the start pulse signal STH. The precise latching process can be performed by delaying the data by about 1.5 clock, and enabling the start pulse signal STH before the delay.

When the signals are applied to the source driver IC as described above, the source driver IC internally latches the effective data, and displays it on an LCD panel.

As discussed earlier, in accordance with the present invention, the circuit for generating the start pulse signal for the source driver IC in the TFT-LCD can remarkably reduce a layout area and restrict setup and hold violations, by generating the start pulse signal by the simple circuit for detecting the leading edge of the data enable signal, instead of a complicated counter circuit.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A circuit for generating a start pulse signal for a source driver IC in a TFT-LCD, comprising:

a first latch unit for receiving a data enable signal and a reset signal, extracting a leading edge of the data enable signal in a leading edge of a main clock signal, and latching the data enable signal in a trailing edge thereof;

a logic gate unit for receiving a complementary signal of the output signal from the first latch unit and the data enable signal, and generating a pulse signal in a leading edge of the data enable signal; and a second latch unit for receiving the output signal from the logic gate unit and the reset signal, outputting the output signal from the logic gate unit as a start pulse signal in the leading edge of the main clock signal, and latching the output signal from the logic gate unit in the trailing edge thereof.

2. The circuit according to claim 1, wherein the first latch unit is an RS flip-flop.

3. The circuit according to claim 1, wherein the logic gate unit is an AND gate.

4. The circuit according to claim 1, wherein the second latch unit is a D flip-flop.

* * * * *